3,293,177
CONTROL OF RHEOLOGICAL PROPERTIES OF
DRILLING FLUID
Charles A. Stratton and Mark W. Branstetter, Bartlesville, Okla., assignors to Phillips Petroleum Company, a corporation of Delaware
No Drawing. Filed May 17, 1963, Ser. No. 281,316
6 Claims. (Cl. 252—8.5)

This invention relates to drilling muds. In one aspect the invention relates to a method for controlling rheological properties of drilling muds. In another aspect it relates to a drilling mud having controlled rheological properties. In another aspect it relates to a method for drilling wells.

In the art of drilling wells by the rotary method, it often is necessary to use a drilling mud (drilling fluid), as is well understood in the art. The drilling mud lubricates the drill stem and bit, carries the cuttings to the surface of the well, and forms a filter cake on the walls of the well, reducing the water loss to the formation and thus reducing the amount of solids filtered out on the wall of the formation. To perform its important functions properly, the drilling mud must have suitable rheological characteristics including viscosity, yield point, initial gel strength and final gel strength in spite of adverse conditions encountered in well drilling.

One of the difficulties encountered in drilling is the undesirable increase in viscosity and gel strength caused by contamination of the drilling mud with materials of the formations penetrated. Various materials have been proposed and used to control viscosity and gel strength under the conditions of drilling, but these materials fail to solve the problem completely when gypsum is encountered.

An object of our invention is to control the rheological properties of drilling fluids.

Another object is to provide a drilling fluid having controlled rheological properties.

Another object of our invention is to facilitate drilling through gypsum-containing earth formations.

Another object of our invention is to control rheological properties in a gypsum-contaminated drilling fluid.

Other aspects, objects and advantages of our invention are apparent in the written description, the drawing and the claims.

According to our invention, the rheological properties of a drilling fluid are controlled by the use of a compound based on a quinone-forming naphthalenediol. Compounds based on quinone-forming naphthalenediols are the naphthalenediols, salts thereof, corresponding naphthoquinones and intermediate oxidation products. Quinone-forming naphthalenediols are 1,2-; 1,4-; 1,5-; 1,7-; 2,3-; and 2,6-naphthalenediols. The compounds which are suitable include those which retain the quinone-forming structure and which can be put into solution or colloidal suspension in the drilling fluid. Preferred compounds include compounds of the formula:

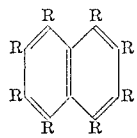

wherein R is selected from the group consisting of hydrogen, 1 to 20 carbon atom alkyls, hydroxyl; at least two and not more than four of said R's being hydroxyl; at least two of said hydroxyls being located in quinone-forming positions and the total carbon atoms in said compound not exceeding 50; ammonium, alkali metal, and alkaline earth metal salts thereof; and oxidation products of the above, including corresponding naphthoquinones, naphthoquinhydrones and semiquinone radicals and semiquinone radical-anions. Examples of these compounds include 1,2-naphthalenediol,
1,4-naphthalenediol,
1,5-naphthalenediol,
1,7-naphthalenediol,
2,3-naphthalenediol,
2,6-naphthalenediol,
4-methyl-1,2-naphthalenediol,
6-ethyl-2,3-naphthalenediol,
2-isopropyl-7-tert-butyl-1,4-naphthalenediol,
2,4-dimethyl-6-isopentyl-1,5-naphthalenediol,
hexamethyl-1,7-naphthalenediol,
1,5-dieicosyl-2,6-naphthalenediol,
1,2,4-naphthalenetriol,
1,3,7-naphthalenetriol,
7-methyl-1,4,5-naphthalenetriol,
1,2,4,5-naphthalenetetrol,
3-butyl-1,2,4,8-naphthalenetetrol,
lithium 1,2-naphthalenedioxide,
sodium 1,7-naphthalenedioxide,
calcium 1,5-naphthalenedioxide,
potassium 2,3-naphthalenedioxide,
ammonium 2-propyl-1,4-naphthalenedioxide,
cesium 1,2,5-naphthalenetrioxide,
strontium 1,2,4,7-naphthalenetetroxide,
barium 4-methyl-1,2,6-naphthalenetrioxide,
rubidium 7-hydroxy-1-naphthoxide,
1,2-naphthoquinone,
1,4-naphthoquinone,
1,5-naphthoquinone,
1,7-naphthoquinone,
2,3-naphthoquinone,
2,6-naphthoquinone,
3-methyl-2,6-naphthoquinone,
7-hydroxy-1,2-naphthoquinone,
1.4-naphthoquinhydrone,
1,7-naphthoquinhydrone,
2,6-naphthoquinhydrone and the like, semiquinone radical obtainable by the oxidation of 2,3-naphthalenediol, semiquinone radical-anion obtainable by the oxidation of sodium 1,4-naphthalenedioxide.

Since drilling fluids must plaster the walls of the well and prevent loss of water to the formation penetrated, as well as perform the other functions described, a plurality of ingredients are used. Usually a quantity of suspended solids is present in the form of clay including some quantity of colloidal clay such as bentonite. A fluid-loss reducing agent often is used such as, for example, sodium carboxymethyl cellulose or other additives. Drilling fluids containing bentonitic clays or other claylike or clayey materials demonstrate a pronounced thickening when the pH is increased without a thinning additive; in some systems the thickening is extreme.

We have found that the naphthalenediols and derivatives of our invention give excellent results in thinning such muds. When gypsum is present, 1,7-naphthalenediol and derivatives thereof give superior results in thinning relatively high pH muds, that is those having a pH above about 10.

Even when the compound added to the mud according to my invention is one of the naphthalenediols or a salt thereof, one or more of the oxidation products including the corresponding naphthoquinone, naphthoquinhydrone, and semiquinone, may form in situ. On the other hand, the oxidation product per se can be the material added to the mud. The amount of the compound added according to our invention usually is between 0.05 and 10 pounds of additive per barrel of drilling fluid, preferably ¼ to 1 pound additive per barrel of mud.

At relatively high values of pH, above about 10, in gypsum-containing muds, known additives for control of rheological properties of drilling fluid become relatively ineffective. On the other hand, the 1,7-napthalenediol and derivatives become more effective under these conditions. This effect occurs when there is present in the drilling fluid at least 0.1 pound per barrel of gypsum. The characteristics of the mud, as determined by the gypsum, do not change appreciably once the mud becomes saturated with respect to this material. This usually will occur with about 1–1.5 pounds per barrel of gypsum present. However, the drilling fluid can have, when drilling through formations cotnaining gypsum, larger amounts of gypsum, commonly up to about 10 pounds per barrel and, when drilling long sections of gypsum, up to about 10–12 percent by volume. The most common range for gypsum in gypsum-containing mud, and the preferred operating range for control of rheological properties with the additives of our invention, is ¼–5 pounds per barrel of drilling fluid. When drilling with a gypsum-base mud, to prevent difficulties associated with changes in mud properties when drilling gypsum sections, the mud often is converted by the addition of gypsum in an amount between about 2 and about 5 pounds per barrel of drilling fluid. The additives of our invention are appropriate for use in a drilling fluid deliberately containing gypsum.

*Example I*

A series of drilling fluids were made from a 6 weight percent bentonite solution. Various additives were used for comparison in this system under varying conditions of pH and gypsum content. The pH was adjusted in each case by titration with a sodium hydroxide solution containing ½ gram sodium hydroxide per cc. The gypsum was added as the dihydrate of calcium sulfate. In each instance the additive to be used was added to the drilling fluid in question and stirred for 10 minutes with a Hamilton Beach stirrer. Sufficient sodium hydroxide was added to give the desired pH, and stirring continued for 15 minutes.

Where the drilling fluid contained gypsum, this material was added to the bentonite mud and the mixture stirred for 10 minutes prior to addition of the additive. In all instances measurements of apparent viscosity, plastic viscosity, yield point, initial gel and 10-minute gel were obtained by the method of "A.P.I. Recommended Practice, Standard Procedures for Testing Drilling Fluids," A.P.I. R.P. 13B, first edition, November 1962, section 2, pages 5 and 6, with a Model 35 Fann V-G Meter (a direct indicating viscosimeter). Values were obtained for each of the additives in amounts of ½, 1 and 2 pounds per barrel in a gypsum-free mud and at 1 pound per barrel for each of the additives in a mud containing 2 pounds per barrel of gypsum. The values obtained were plotted and values read from the charts at pH values of 6.5, 7.5, 8.5, 9.5, 10.5, 11.5 and the maximum pH obtained in the run. These values are presented in Table I. Curves are reproduced in FIGURES 1–10 for the values obtained with 1 pound of the additive per barrel of drilling fluid. FIGURES 1–5 illustrate values obtained in a gypsum-free fluid while FIGURES 6–10 represent values obtained in a gypsum-containing fluid. It can be seen that the naphthalenediols are comparable with the additives of the prior art and that, in gypsum-containing mud above a pH of about 10, 1,7-naphthalenediol is superior to the other additives.

TABLE I

| Run | Additive | (Lb./Bbl.) | Gypsum[1] | pH 6.5 | | | | | pH 7.5 | | | | | pH 8.5 | | | | |
|---|---|---|---|---|---|---|---|---|---|---|---|---|---|---|---|---|---|---|
| | | | | AV | PV | YP | Initial Gel | 10 Min. Gel | AV | PV | YP | Initial Gel | 10 Min. Gel | AV | PV | YP | Initial Gel | 10 Min. Gel |
| 1 | A | 0.5 | | 23 | 13 | 19 | 14 | 30 | 23 | 15 | 15 | 7 | 29 | 22 | 16 | 11 | 4 | 28 |
| 2 | A | 1.0 | | 24 | 15 | 18 | 16 | 32 | 22 | 16 | 13 | 8 | 30 | 21 | 15 | 12 | 4 | 28 |
| 3 | A | 2.0 | | 24 | 14 | 18 | 14 | 34 | 22 | 13 | 15 | 9 | 33 | 21 | 14 | 13 | 9 | 32 |
| 4 | A | 1.0 | 2 | 16 | 5 | 21 | 12 | 17 | 22 | 7 | 32 | 17 | 26 | 30 | 7 | 47 | 22 | 28 |
| 5 | B | 0.5 | | | | | | | 22 | 14 | 18 | 19 | 31 | 25 | 16 | 18 | 20 | 34 |
| 6 | B | 1.0 | | | | | | | 25 | 15 | 19 | 21 | 32 | 26 | 15 | 21 | 24 | 32 |
| 7 | B | 2.0 | | | | | | | 26 | 16 | 19 | 22 | 30 | 25 | 14 | 23 | 27 | 34 |
| 8 | B | 1.0 | 2 | | | | | | 18 | 7 | 23 | 14 | 18 | 27 | 7 | 40 | 21 | 23 |
| 9 | C | 0.5 | | | | | | | 23 | 15 | 15 | 13 | 28 | 23 | 15 | 14 | 9 | 29 |
| 10 | C | 1.0 | | | | | | | 22 | 13 | 17 | 15 | 30 | 22 | 14 | 15 | 12 | 31 |
| 11 | C | 2.0 | | | | | | | 21 | 13 | 16 | 15 | 28 | 21 | 14 | 15 | 10 | 27 |
| 12 | C | 1.0 | 2 | | | | | | 21 | 7 | 29 | 15 | 18 | 22 | 8 | 28 | 14 | 17 |
| 13 | D | 0.5 | | | | | | | 29 | 19 | 21 | 17 | 35 | 28 | 18 | 20 | 16 | 36 |
| 14 | D | 1.0 | | | | | | | 33 | 24 | 16 | 17 | 31 | 30 | 24 | 14 | 11 | 31 |
| 15 | D | 2.0 | | | | | | | 29 | 19 | 21 | 19 | 34 | 27 | 18 | 17 | 14 | 29 |
| 16 | D | 1.0 | 2 | | | | | | 23 | 8 | 28 | 11 | 23 | 27 | 10 | 34 | 12 | 27 |

| Run | pH 9.5 | | | | | pH 10.5 | | | | | pH 11.5 | | | | | At Final pH | | | | | Final pH[2] |
|---|---|---|---|---|---|---|---|---|---|---|---|---|---|---|---|---|---|---|---|---|---|
| | AV | PV | YP | Initial Gel | 10 Min. Gel | AV | PV | YP | Initial Gel | 10 Min. Gel | AV | PV | YP | Initial Gel | 10 Min. Gel | AV | PV | YP | Initial Gel | 10 Min. Gel | |
| 1 | 21 | 16 | 8 | 3 | 10 | 19 | 18 | 5 | 2 | 2 | 19 | 17 | 2 | 2 | 2 | | | | | | 11.5 |
| 2 | 23 | 19 | 9 | 2 | 17 | 22 | 19 | 5 | 1 | 2 | 17 | 15 | 2 | 1 | 2 | 16 | 14 | 2 | 1 | 2 | 11.9 |
| 3 | 20 | 15 | 9 | 2 | 24 | 19 | 17 | 5 | 1 | 6 | 16 | 15 | 3 | 1 | 4 | 15 | 13 | 2 | 2 | 2 | 12.4 |
| 4 | 12 | 6 | 11 | 9 | 20 | 14 | 11 | 4 | 15 | 50 | 28 | 15 | 25 | 35 | 70 | 14 | 10 | 8 | 15 | 46 | 12.1 |
| 5 | 22 | 16 | 15 | 9 | 33 | 20 | 15 | 9 | 1 | 22 | 24 | 19 | 12 | 3 | 17 | 40 | 22 | 35 | 14 | 62 | 11.9 |
| 6 | 24 | 15 | 17 | 20 | 32 | 20 | 17 | 6 | 3 | 19 | | | | | | 22 | 19 | 6 | 1 | 4 | 11.4 |
| 7 | 22 | 13 | 17 | 24 | 42 | 19 | 14 | 9 | 4 | 25 | | | | | | 22 | 17 | 7 | 2 | 16 | 11 |
| 8 | 24 | 5 | 37 | 16 | 18 | 16 | 12 | 10 | 21 | 50 | 20 | 14 | 12 | 18 | 65 | 14 | 10 | 7 | 16 | 65 | 12.1 |
| 9 | 23 | 18 | 12 | 5 | 25 | 22 | 19 | 6 | 2 | 5 | 25 | 20 | 8 | 3 | 7 | 34 | 21 | 26 | 5 | 35 | 11.8 |
| 10 | 21 | 16 | 11 | 6 | 16 | 19 | 17 | 5 | 1 | 2 | 25 | 19 | 10 | 1 | 3 | 31 | 22 | 17 | 2 | 4 | 11.8 |
| 11 | 22 | 16 | 9 | 3 | 24 | 20 | 18 | 4 | 1 | 2 | 23 | 20 | 4 | 2 | 2 | 24 | 21 | 5 | 2 | 2 | 11.7 |
| 12 | 19 | 9 | 22 | 10 | 26 | 14 | 12 | 4 | 7 | 18 | 11 | 10 | 1 | 6 | 25 | 11 | 10 | 1 | 5 | 30 | 11.9 |
| 13 | 27 | 15 | 24 | 24 | 42 | 32 | 21 | 22 | 33 | 58 | 40 | 25 | 29 | 39 | 61 | >80 | 18 | >80 | >80 | >80 | 11.8 |
| 14 | 29 | 19 | 17 | 19 | 35 | 25 | 16 | 19 | 21 | 38 | 54 | 20 | 51 | 49 | 50 | 67 | 22 | 89 | 69 | 63 | 11.8 |
| 15 | 32 | 20 | 24 | 25 | 45 | 26 | 18 | 16 | 18 | 39 | | | | | | 38 | 21 | 33 | 37 | 35 | 11.4 |
| 16 | 27 | 7 | 41 | 23 | 19 | 16 | 14 | 2 | 3 | 12 | 6 | 6 | 0 | 3 | 2 | 4 | 4 | 0 | 2 | 2 | 12.3 |

AV = Apparent viscosity, centipoise.
PV = Plastic viscosity, centipoise.
YP = Yield point, lb./100 ft.².
A = Pyrogallol.
B = Pyrocatechol.
C = Quebracho.
D = 1,7-naphthalenediol.
[1] Calcium sulfate dihydrate.
[2] This is the highest pH tested in each series.

This example demonstrates that 1,7-naphthalenediol is an effective thinner in drilling mud systems and is a superior thinner in gypsum-containing muds.

Example II

A series of drilling fluids were made from a 6 weight percent bentonite solution, similar to that of Example I, and using the same bentonite clay to that Example I. 1,5-naphthalenediol and 2,3-naphthalenediol were tested at varying pH. In each instance the additive to be used was added to the drilling fluid in question and stirred for 10 minutes with a Hamilton Beach stirrer. Sufficient sodium hydroxide was added to give the desired pH, and stirring continued for 15 minutes. The measurements of viscosity, yield point, and gel were obtained by the method of Example I. The results are presented in Table II.

TABLE II

| Additive, grams: | | | | | | | | |
|---|---|---|---|---|---|---|---|---|
| 2,3-naphthalenediol | 1.0 | 1.0 | 1.0 | 1.0 | | | | |
| 1,5-naphthalenediol | | | | | 1.0 | 1.0 | 1.0 | 1.0 |
| 6% Bentonite | 364 | 364 | 364 | 364 | 364 | 364 | 364 | 364 |
| NaOH, ml | 0.5 | 1.0 | 1.5 | 2.0 | 0.5 | 1 | 1.5 | 2.0 |
| Gels: | | | | | | | | |
| 0 | 24 | 30 | 21 | 33 | 16 | 15 | 4 | Thick |
| 10 | 30 | 33 | 65 | 95 | 17 | 18 | 9 | Thick |
| Viscosities: | | | | | | | | |
| AV | 33 | 43 | 40 | 37 | 21 | 28 | 22 | Thick |
| PV | 11 | 12 | 26 | 30 | 5 | 7 | 20 | Thick |
| YP | 44 | 61 | 28 | 14 | 32 | 41 | 3 | Thick |
| pH | 9.2 | 9.9 | 10.8 | 11.8 | 8.9 | 10.1 | 10.9 | Thick |

TABLE III

| Additive, grams: | | | | | | | | |
|---|---|---|---|---|---|---|---|---|
| 2,6-dihydroxynaphthalene | 0 | 0.5 | 0.5 | 0.5 | 1 | 1 | 1 | 1 |
| 6% Bentonite | 364 | 364 | 364 | 364 | 364 | 364 | 364 | 364 |
| NaOH, ml | 0 | 0 | 1.0 | 1.5 | 0 | 0.5 | 1.0 | 1.8 |
| Gels: | | | | | | | | |
| 0 | 39 | 11 | 6 | 12 | 7 | 22 | 17 | 18 |
| 10 | 67 | 31 | 29 | 75 | 15 | 56 | 49 | 73 |
| Viscosities: | | | | | | | | |
| AV | 71 | 65 | 59 | 57 | 56 | 57 | 53 | 54 |
| PV | 36 | 39 | 39 | 42 | 36 | 42 | 34 | 39 |
| YP | 69 | 51 | 39 | 30 | 40 | 29 | 37 | 29 |
| pH | 8.5 | 7.0 | 9.3 | 10.8 | 7.2 | 8.4 | 8.9 | 10.9 |

Reasonable variation and modification are possible within the scope of this invention which sets forth improved drilling fluids, a method for control of rheological properties of drilling fluids and a method for drilling wells.

We claim:

1. A water base drilling mud comprising, in combination:
    sufficient water to maintain said water mud fluid;
    sufficient suspended solids to form a filter cake on the wall of a well;
    a sufficient amount of a compound selected from the group consisting of 1,7-naphthalenediol, ammonium, alkali metal, and alkaline earth metal salts thereof, and
    corresponding oxidation products thereof selected from naphthoquinone, naphthoquinhydrone, semiquinone radical and semiquinone radical-anion to maintain the viscosity of said mud low enough to be circulated.

2. The drilling mud of claim 1, wherein said amount is between 0.05 and 10 pounds per barrel of said mud.

3. The drilling mud of claim 1, wherein said amount is between ¼ and 1 pound per barrel of said mud.

4. The water base drilling mud of claim 1 wherein said mud contains between 0.1 pound of gypsum per barrel of drilling fluid and 10–12 percent by volume of gypsum, a sufficient amount of alkali to maintain the pH of said mud over 10 and said sufficient amount of the compound is between 0.05 and 10 pounds per barrel of mud.

5. The water base drilling mud of claim 1 wherein said mud contains between ¼ and 5 pounds of gypsum per barrel of mud, a sufficient amount of alkali to maintain the pH of said mud above 10 and said sufficient amount of a compound is between ¼ and 1 pound per barrel of mud.

6. In a method for drilling wells comprising the steps of drilling said well with well drilling tools and circulating through the well during said drilling a water base drilling mud which forms a filter cake on the wall of the well, the improvement which comprises incorporating in said drilling mud a compound selected from the group consisting of 1,7-naphthalenediol, ammonium, alkali metal, and alkaline earth metal salts thereof, and
    corresponding oxidation products thereof selected from naphthoquinone, naphthoquinhydrone, semiquinone radical and semiquinone radical-anion to maintain the viscosity of said mud low enough to be circulated.

References Cited by the Examiner

UNITED STATES PATENTS

| | | | |
|---|---|---|---|
| 2,109,858 | 3/1938 | Cannon | 252—8.5 |
| 2,555,265 | 5/1951 | Bergman | 252—8.5 |
| 2,702,790 | 2/1955 | Teichmann et al. | 252—8.5 |
| 3,223,621 | 12/1965 | Marlow et al. | 252—8.5 |

OTHER REFERENCES

"Petroleum," Zeitschrift, No. 44, Nov. 2, 1932, pages 7 and 8.

Gregory, Uses and Applications of Chemicals and Related Materials, pub. 1939 by Reinhold Pub. Co., New York, N.Y., vol. 1, pages 243 and 244.

LEON D. ROSDOL, *Primary Examiner.*

JULIUS GREENWALD, ALBERT T. MEYERS,
*Examiners.*

H. B. GUYNN, *Assistant Examiner.*